Figure 1:
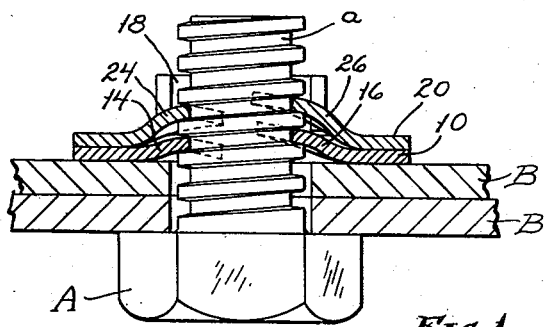

May 11, 1943.  B. A. PARR  2,318,708
SHEET METAL NUT
Filed Aug. 22, 1942  2 Sheets-Sheet 1

INVENTOR.
Bernard Arthur Parr
BY
Bates, Teare & McBean
Attorneys.

May 11, 1943.　　　B. A. PARR　　　2,318,708
SHEET METAL NUT
Filed Aug. 22, 1942　　　2 Sheets-Sheet 2

INVENTOR.
Bernard Arthur Parr
BY
Baker, Tear & McBean
Attorneys.

Patented May 11, 1943

2,318,708

UNITED STATES PATENT OFFICE 2,318,708

SHEET METAL NUT

Bernard Arthur Parr, East Sheen, London, England, assignor to Tinnerman Products, Inc., Cleveland, Ohio, a corporation of Ohio Application August 22, 1942, Serial No. 455,793
In Great Britain May 14, 1942

18 Claims. (Cl. 85—36)

This invention relates to nuts of the kind constructed of sheet metal having a thickness less than the pitch of the threads of the bolt or screw with which they are to be used, and comprising a base from which are struck bolt or screw thread engaging means, so as to project to one side of said base, hereafter referred to as upwardly of the base. Such thread engaging means usually take the form of opposed yieldable tongues suitably recessed at their free ends, the base comprising end portions connected by bridge portions between which the tongues extend.

In order to provide additional engagement of the bolt or screw thread and thereby increased strength, fasteners of the kind above mentioned have been formed from a single strip of sheet metal that is bent intermediately to provide two superposed arms from each of which bolt or screw thread engaging means project upwardly, thus providing two spaced superposed sheet metal nuts connected by an integral web portion. This type of fastener has the disadvantage that the base of the upper sheet metal nut is supported only at one end or at the most at both ends, and is thus somewhat yielding so that the most of the stresses are thrown on the lower nut.

The present invention has for its object the provision of an improved form of fastener in which this disadvantage is obviated, and a rigid support provided for each superposed nut.

The improved fastener in accordance with the present invention, comprises a plurality of separate sheet metal nuts of the kind above mentioned, and means securing one nut to the other with the thread-engaging means of the nuts extending upwardly substantially in axial alignment for engaging successive threads and with the base of each upper nut seated on the base of the nut below it.

The securing means is preferably integral with the lower nut and advantageously comprises flanges extending upwardly from opposed sides of the base of the lower nut and having end portions bent inwardly to overlie the base of the upper nut. The said flanges prevent lateral separation of the two nuts, and the engagement between the inturned end portions of the flanges with the base of the upper nut prevents vertical separation thereof while the upwardly projecting thread-engaging means of the lower nut prevents end-wise separation of the two nuts.

The securing means preferably affords limited relative movement to the upper nut in all directions transverse to the axis of the fastener so that a bolt can readily be advanced into the fastener into uniform threaded engagement with the successive nuts. The upstanding flanges on the base of the lower nut are advantageously formed to provide flats for engagement by a standard wrench or spanner.

The thread-engaging means of the nuts of the improved fastener may comprise opposed yieldable tongues bent to a substantial ogee formation with the free ends of the tongues shaped to lie on a helix complementary to the thread of the bolt with which the fastener is to be used and also lying on a circle having a diameter the same as or substantially the same as the core diameter of the bolt. The tongues of the upper nut project above the base of the lower nut a distance greater than the distance which the tongues of the lower nut project above its base so that the tongues of the upper nut readily engage a convolution of the bolt thread different from that engaged by the tongues of the lower nut.

My invention is not limited to merely two sheet metal nuts as three or more such nuts may be employed, the bottom nut having its side flanges extending across the bases of all of the surmounting nuts and being flanged inwardly over the top nut. While such stack of superimposed nuts have their bases each bearing against the one below it to furnish a rigid support, the thread-engaging portions are spaced to engage successive threads. This spacing may be accomplished by greater distortion in the tongues of each succeeding nut, or by placing annular distance pieces between the nuts, in which case all of the nuts, after the first, could have identical formation.

Several approved embodiments of my invention are illustrated in the drawings hereof and hereinafter more fully described and the essential novel features are summarized in the claims.

Figure 2:
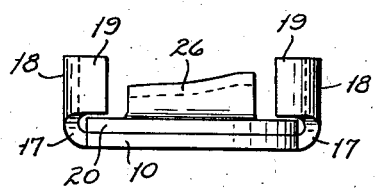
Figure 3:
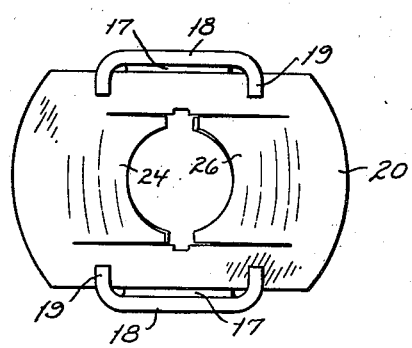
Figure 4:
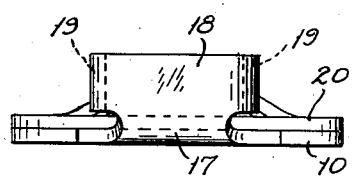
Figure 5:
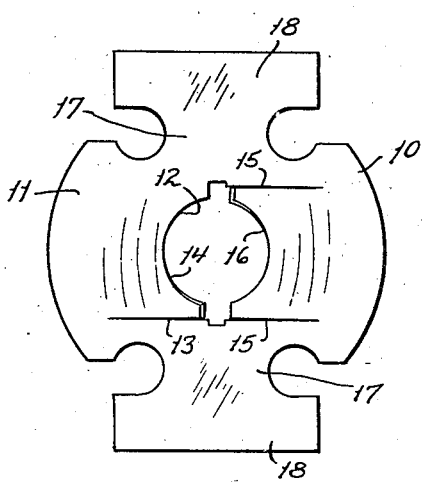
Figure 6:
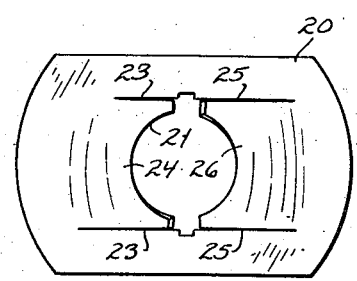
Figure 7:
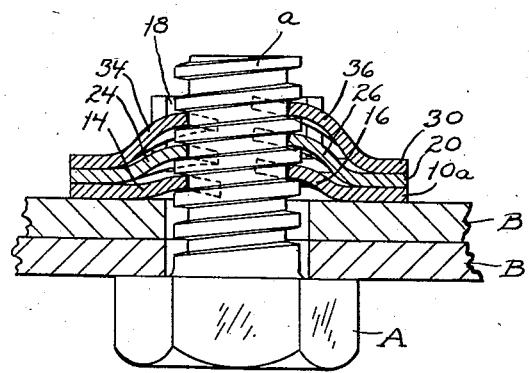
Figure 9:
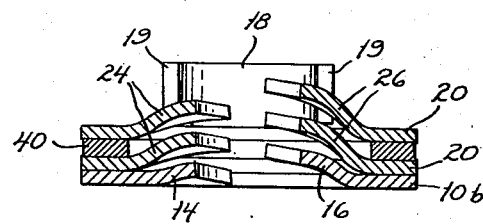
Figure 8:
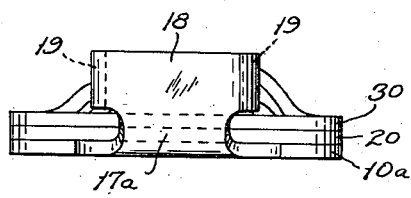
Figure 10:
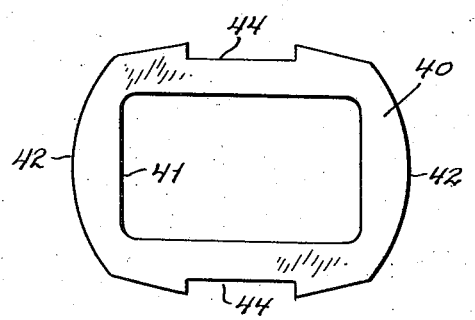
Figure 11:
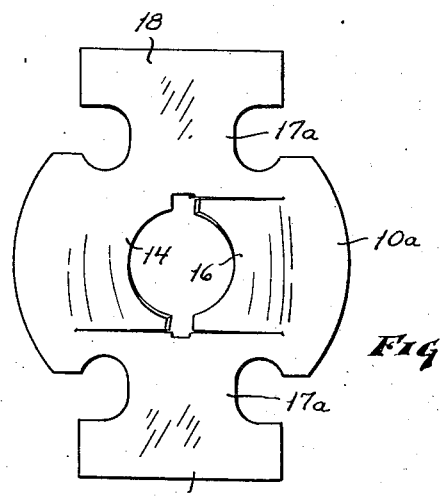

In the drawings, Fig. 1 is a side elevation of a bolt extending upwardly through a support and locked in place by one of my multiple nuts, the nut being shown in section; Fig. 2 is an end elevation of the multiple nut; Fig. 3 is a plan thereof; Fig. 4 is a side elevation thereof; Fig. 5 is a plan of the formed blank from which the lower nut of the preceding figures is made; Fig. 6 is a plan of the cut blank for the upper nut; Fig. 7 is a view similar to Fig. 1 when three nuts are employed; Fig. 8 is a side elevation of the three-nut formation of Fig. 7; Fig. 9 is a section of another triple nut embodiment employing a separate distance piece between the second and third nuts; Fig. 10 is a plan of the distance piece used in the embodiment of Fig. 9; Fig. 11 is a plan of the cut blank for the lower nut of Figs. 7 and 8, the blank for the lower nut of Fig. 9 being similar but with the lateral necks for the side flanges elongated.

As shown in Figs. 1 and 7, A indicates a bolt having a shank $a$ provided with a screw thread, the thread shown being of the conventional square formation. B indicates two structural plates being secured together by the bolt A and my multiple nut.

The lower nut 10 of my multiple nut has a flat base 11 through which there is a central opening 12 on the opposite sides of which the base is slitted to enable the warping of the adjacent material to provide helical engaging surfaces. That is to say, on one side there is at least one slit 13 so that the edge portion 14 may be helically warped, on the other side two slits 15 providing between them a tongue 16 which may be raised bodily in an inclined direction and its edge warped, the two edges thus providing a continuous helical turn corresponding to the thread of the bolt to be used.

From opposite sides of the base 11 there extend narrow necks 17 with wider heads 18 beyond them. These lateral extensions (originally formed as part of a flat blank shown in Fig. 5) are bent upwardly at the narrow necks 17 so that the upper portion of the neck and the head 18 stands vertically. Then after the upper nut, to be described, is placed on the base 11 the extreme end portions of the heads 18 are bent inwardly at right angles as shown at 19 to overhang the top of the upper nut and prevent upward movement thereof.

The upper nut is designated 20; the cut blank for it is illustrated in Fig. 6. It has a central opening 21 and parallel slits 23 to provide a tongue 24 on one side thereof and slits 25 to provide a tongue 26 on the other side thereof. These tongues are tipped upwardly and their edges are oppositely warped so that the two tongues bound a helix. The upward bending of the tongues 24 and 26 is sufficiently greater than that of the portions 14 and 16 on the lower nut so that when the base 20 rests firmly on the base 11, as shown in Fig. 1, the warped edges of the superposed nuts will be spaced a thread distance apart.

After the lower nut has been completely formed, except as to turning in the ends 19, and the upper nut completely formed, the upper nut is placed on the lower nut and the ends of the heads 18 of the side flanges turned inwardly above the upper nut, as shown at 19, in Fig. 3, thus holding it down effectively on the lower nut. The side wings or lateral flanges of the lower nut thus prevent the upper nut from shifting out of place laterally or upwardly. Longitudinal shifting is prevented by the rise of the thread-engaging portions 14 and 16 of the lower nut above the bottom of the upper nut. Thus the two nuts are bound together as a unit.

However, it is desirable to have some play between the two nuts to allow the upper nut to accommodate itself to the bolt thread after the latter has engaged the lower nut, and this is accomplished by clearance between the inner faces of the upturned side flanges of the lower nut and the side edges of the upper nut and clearance between the upper nut and the lower edges of the inturned wings 19, as shown in Fig. 2. As indicated in Fig. 1, there is also a limited possible longitudinal shifting of the upper nut on the lower nut.

In Figs. 7 and 8, I have illustrated a construction of employing three surmounting sheet metal nuts 10a, 20 and 30. The nut 20 is identical with that heretofore described. The nut 30 is similar to the nut 20 but with tongues 34 and 36 tipped up higher than the tongues 24 and 26 by an amount corresponding to a screw thread. That is to say, the tongue 36, for instance, is as much above the tongue 26 as the tongue 26 is above the tongue 16.

In the embodiment of Figs. 7 and 8, the lower nut 10a differs from that nut 10 heretofore described only in the height of the neck of the side wings. This neck 17a is made longer than the neck 17 of Fig. 5, so that the heads 18, when the side flanges are bent over, stand at a height above the base slightly greater than two thicknesses of the nut metal, enabling the ends 19 of the head to be bent across the top nut, as illustrated in Fig. 3.

In place of forming the third nut differently from the nut 20 as to the length and elevation of its tongues, I can make it identical with the nut 20 by supporting it a thread distance above the nut 20 by a suitable annular distance piece. This construction is illustrated in Fig. 9. Here the lower nut member designated 10b is the same as that shown in Fig. 11, except that the neck is still longer than the neck 17a to make the lower edges of the bent in wings 19 stand above the base a distance slightly greater than three thicknesses of the metal.

In the construction of Fig. 9 I employ two identical surmounting nuts 20, such second and third nuts being separated by the annular distance member 40. This distance piece is a flat sheet of metal of a thickness equal to the difference between the pitch distance and the thickness of the nut, and has a rectangular opening 41 through it large enough so that the piece will not encroach upon the raised tongues. The exterior contour of the distance piece may, at its end portions 42, be the same as that of any of the nuts, while the side portions are preferably wider than the upper nuts and have rectangular notches 44 in them, whereby they are adapted to embrace the necks of the upturned side wings of the bottom nut. This holds the distance piece in place in the unitary structure with the base nut and the two upper nuts.

It will be obvious that the construction of Figs. 9 and 10 might be continued for four or five or more nuts by simply surmounting the embodiment of Fig. 9 with another annular distance piece and another nut, identical with those shown, and so on to whatever extent desired, the necks of the base nut being correspondingly lengthened so that the inturned heads 19 would come over the topmost nut.

It will be seen that in each of the embodiments illustrated and described, I have provided a nut of sheet metal construction for engagement with successive threads of a bolt or screw by means of a plurality of rigidly surmounted nuts, the base of each of which has a definite rigid support. I am thus able to increase the holding strength of the nut to any extent desired. At the same time, the surmounting nut construction may be handled as a unit, the same as an ordinary tapped nut. The flat side wings 18, parallel with each other, provide for the ready application of a wrench for holding the nut or turning it. Notwithstanding this unitary action of the nut, each surmounting nut may adapt itself slightly to the bolt by reason of the clearance provided by the side wings of the bottom nut.

My fastener is preferably constructed of spring material, so that the thread engaging tongues may bend somewhat toward the base of each nut as the bolt is screwed in until they obtain a very firm strut action against the bolt. The entire construction of my multiple nut may be readily formed from sheet strip stock of spring steel by simple stamping and bending operations.

I claim:

1. A multiple nut made of a plurality of separate superposed sheet metal members, the base of an upper member being rigidly supported by the base of a lower member, each member being formed with an opening and opposed thread-engaging edges about the opening, and means for holding said nut members together as a unit.

2. A multiple nut adapted to be applied as a unit comprising a lower sheet metal nut and a surmounting sheet metal nut, said surmounting nut having its thread-engaging portions spaced above the corresponding portions of the lower nut by the thread distance, and means on the lower nut for preventing both lateral and vertical separation of the nuts.

3. A multiple sheet metal nut comprising a plurality of separate sheet metal nuts one above the other and bearing thereon, each nut being formed by distortion of the metal thereof to provide a thread-engaging edge, the edges of different nuts being spaced to engage different thread grooves, and means for holding the plurality of nuts in superposed relation.

4. A multiple sheet metal nut comprising two separate sheet metal nuts one above the other and bearing thereon, each nut being formed by distortion of the metal to provide a thread-engaging edge, and means formed integrally with one of the nuts and bent across the adjacent nut for holding the two nuts in nested relationship.

5. A multiple sheet metal nut comprising a base member having an opening for the passage of a bolt and having distorted thread-engaging portions adjacent the opening to coact with the helical groove of the bolt shank passing through the opening, a pair of flanges formed integrally on the base and bent upwardly at right angles thereto, and a surmounting nut made of sheet metal and having a base and raised tongues distorted therefrom adapted to engage the next thread of the bolt, said second nut standing between the upturned flanges of the first nut and having its base resting on the base of the first nut.

6. A multiple sheet metal nut comprising a base member having an opening for the passage of a bolt and having distorted thread-engaging portions adjacent the opening to coact with the helical groove of the bolt shank passing through the opening, and a surmounting nut made of sheet metal and having a base and raised tongues distorted therefrom and adapted to engage the next thread of the bolt, said second nut having its base resting on the first nut, and means for preventing the upward separation of the second nut from the first.

7. A multiple sheet metal nut comprising a base member having an opening for the passage of a bolt and having distorted thread-engaging portions adjacent the opening to coact with the helical groove of the bolt shank passing through the opening, a pair of wings formed integrally on opposite sides of the base and bent upwardly at right angles thereto and a surmounting nut made of sheet metal and having a base and raised tongues distorted therefrom and adapted to engage the next thread of the bolt, said second nut standing between the upturned wings of the first nut, the vertical edges of the upwardly extending wings of the first nut being bent inwardly above the second nut to prevent vertical separation of the nuts.

8. In a multiple sheet metal nut construction, the combination of a base having an opening for the passage of a bolt and distorted edges on opposite sides of the opening to engage a bolt thread, said base having flat upturned side flanges providing parallel surfaces suitable for engagement by the jaws of a wrench, and a surmounting nut comprising a sheet metal member between said side flanges and resting on the base of the lower nut and having tongues formed to engage another thread of the bolt, and means for preventing separation of said nuts.

9. In a multiple sheet metal nut construction, the combination of a base having an opening for the passage of a bolt and distorted edges on opposite sides of the opening to engage a bolt thread, said base having upturned side flanges, and a surmounting nut comprising a sheet metal member resting on the base of the lower nut and having tongues formed to engage another thread of the bolt, the side flanges of the bottom nut being formed as comparatively narrow necks adjoining the base of the nut and a wider head portion above the necks, the ends of the head portion being bent inwardly to overlie the top of the base of the upper nut.

10. A nut of sheet metal construction comprising a lower nut having a base with a bolt opening and distorted edges about the opening to engage a bolt thread, a second nut formed of sheet metal and having its base resting on the base of the lower nut and having opposed tongues tipped upwardly at a greater angle from the base than the distorted portions of the lower nut, and means for holding the two nuts together so that they may be applied as a unit.

11. A nut of sheet metal construction comprising a lower nut having a base with a bolt opening and distorted edges about the opening to engage a bolt thread, a second nut formed of sheet metal and having its base resting on the base of the lower nut, said second nut having opposed tongues tipped upwardly at a greater angle from the base than the distorted portions of the lower nut, and means on one of the nuts overlapping the other nut to prevent lateral displacement thereof.

12. A multiple nut made of a plurality of superposed sheet metal members, mutually detached from each other and each formed with an opening and opposed thread-engaging edges about the opening, means for holding said nuts together as a unit while allowing slight play of the upper nut in its own plane with reference to the lower, enabling it to adapt itself to a bolt occupying the lower nut.

13. A multiple nut of sheet metal construction comprising a lower nut having a bolt opening and distorted edges about the opening to correspond to a thread groove, a separate upper nut having a base resting on the base of the lower nut and having a bolt opening and adjacent edge portions distorted to a greater extent than the lower nut so as to engage another thread of said bolt, and means for holding said two nuts together for operation as a unit while allowing a slight play of the upper nut with reference to the lower nut.

14. A multiple sheet metal nut comprising a lower nut having a bolt opening and distorted portions about the opening adapted to engage a helical thread and flanges extending upwardly from such lower nut, and a separate upper nut having a bolt opening and thread-engaging members on opposite sides thereof and a base overlying the base of the first nut, the second nut being laterally positioned on the first by the said flanges and the ends of the flanges being bent in above the second nut, whereby both nuts are permanently held together, the binding of the first nut on the second allowing some independent movement of the second laterally and vertically.

15. A multiple nut adapted to be applied as a unit comprising a lower sheet metal nut and a plurality of surmounting sheet metal nuts, said surmounting nuts having their thread engaging portions spaced each from the other by the thread distance, the lower nut having side flanges overlapping all of the other nuts and preventing lateral displacement thereof, said flanges being turned in above the top face of the topmost nut to prevent vertical displacement of any of the nuts.

16. A multiple sheet metal nut comprising a lower nut having an opening and upwardly distorted portions on opposite sides of the opening to engage the thread of a bolt, a second nut having a base resting on the base of the first nut and having a bolt opening with raised tongues about the same bent upwardly at a greater distance than the distortion of the lower nut to engage the next thread, and a third nut having a base resting on the second nut and having a bolt opening and tongues formed from the nut and bent upwardly as great a distance above the tongues of the second nut as they are above the thread-engaging portion of the first nut, the lowermost nut having upturned side flanges extending across the edges of the second and third nuts, and means for preventing separation of the nuts.

17. A multiple nut of sheet metal construction comprising a lower nut having a bolt opening and distorted edges on opposite sides thereof to engage one helical thread groove of a bolt, an upper nut having a base with a bolt opening and distorted edges about the opening to enable the upper nut to engage a thread groove, a distance piece between the two nuts spacing them a thread distance apart, and a member engaging the under face of the lower nut and the upper face of the upper nut for holding the two nuts and distance piece together as a unit.

18. A multiple sheet metal nut construction comprising a lower nut having a bolt opening and distorted edges about the opening to provide thread-engaging members leading inwardly from a flat base, a second sheet metal nut having a flat base resting on the first nut and having raised tongues providing thread-engaging members spaced from those of the first nut, an annular distance member resting on the base of the second nut, and a third nut identical with the second nut and resting on the distance member, and means for holding said parts together for application as a unit.

BERNARD ARTHUR PARR.